(12) United States Patent
Elimeleh et al.

(10) Patent No.: US 10,860,465 B2
(45) Date of Patent: Dec. 8, 2020

(54) AUTOMATICALLY RERUNNING TEST EXECUTIONS

(71) Applicant: HEWLETT PACKARD ENTERPRISE DEVELOPMENT LP, Houston, TX (US)

(72) Inventors: Hofit Elimeleh, Yehud (IL); Noam Kachko, Yehud (IL); Gil Baruch, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 674 days.

(21) Appl. No.: 15/536,427

(22) PCT Filed: Dec. 23, 2014

(86) PCT No.: PCT/US2014/072020
§ 371 (c)(1),
(2) Date: Jun. 15, 2017

(87) PCT Pub. No.: WO2016/105352
PCT Pub. Date: Jun. 30, 2016

(65) Prior Publication Data
US 2017/0351599 A1 Dec. 7, 2017

(51) Int. Cl.
*G06F 11/36* (2006.01)
*G06F 11/26* (2006.01)
(Continued)

(52) U.S. Cl.
CPC ........ *G06F 11/3688* (2013.01); *G06F 11/263* (2013.01); *G06F 11/2635* (2013.01); *G06F 16/00* (2019.01); *G06F 17/18* (2013.01)

(58) Field of Classification Search
None
See application file for complete search history.

(56) References Cited

U.S. PATENT DOCUMENTS 9,244,818 B1 * 1/2016 Paleja ............... G06F 21/50
2003/0149526 A1 * 8/2003 Zhou ................. G01S 5/0027
701/408
(Continued)

FOREIGN PATENT DOCUMENTS

WO 2011042282 4/2011

OTHER PUBLICATIONS

Elbaum, S. et al., "Techniques for Improving Regression Testing in Continuous Integration Development Environments," (Research Paper), Nov. 16-21, 2014.
(Continued)

*Primary Examiner* — Daxin Wu

(57) ABSTRACT

Example implementations relate to automatically rerunning test executions. Some implementations may capture data during executions of a test. The data may include test status data, test rerun data, test owner data, and/or code committer data. Some implementations may also dynamically determine, for a failed execution of the test, a number of reruns to execute based on the captured data. Additionally, some implementations may cause in response to the dynamic determination, automatic rerun executions of the test until one of the rerun executions passes, the rerun executions being performed up to the number of times.

20 Claims, 3 Drawing Sheets

(51) Int. Cl.
*G06F 16/00* (2019.01)
*G06F 11/263* (2006.01)
*G06F 17/18* (2006.01)

(56) References Cited

U.S. PATENT DOCUMENTS

| | | | |
|---|---|---|---|
| 2006/0005088 A1* | 1/2006 | Zeng | G11C 29/56 |
| | | | 714/724 |
| 2008/0010542 A1* | 1/2008 | Yamamoto | G06F 11/3672 |
| | | | 714/38.1 |
| 2008/0282124 A1 | 11/2008 | Esposito et al. | |
| 2011/0296382 A1* | 12/2011 | Pasternak | G06F 11/3688 |
| | | | 717/124 |
| 2011/0296383 A1 | 12/2011 | Pasternak | |
| 2012/0005537 A1* | 1/2012 | Chen | G06F 11/3692 |
| | | | 714/38.1 |
| 2012/0173490 A1 | 7/2012 | Gould et al. | |
| 2012/0253728 A1* | 10/2012 | Chamas | G06F 11/2294 |
| | | | 702/109 |
| 2012/0324289 A1 | 12/2012 | Funnell | |
| 2012/0330593 A1* | 12/2012 | Johnson | G01R 31/2894 |
| | | | 702/85 |
| 2013/0036405 A1* | 2/2013 | Verbest | G06F 11/3672 |
| | | | 717/131 |
| 2013/0152047 A1 | 6/2013 | Moorthi et al. | |

OTHER PUBLICATIONS

International Search Report & Written Opinion received in PCT Application No. PCT/US2014/072020, dated Jul. 31, 2015, 12, pages.

Mockun, Z., "Automated tests in Continuous Integration environment—Part 2," (Web Page), Aug. 15, 2011.

* cited by examiner

AUTOMATICALLY RERUNNING TEST EXECUTIONS

BACKGROUND

Modern application development practices may include frequently integrating new or changed code with an existing code repository. To ensure the compatibility of the new or changed code with code developed by other developers, each portion of the new or changed code may be verified by executions of tests to detect integration problems between the new or changed code and the existing parts of the application.

BRIEF DESCRIPTION OF THE DRAWINGS

The following detailed description references the drawings, wherein.

DETAILED DESCRIPTION

Figure 1:
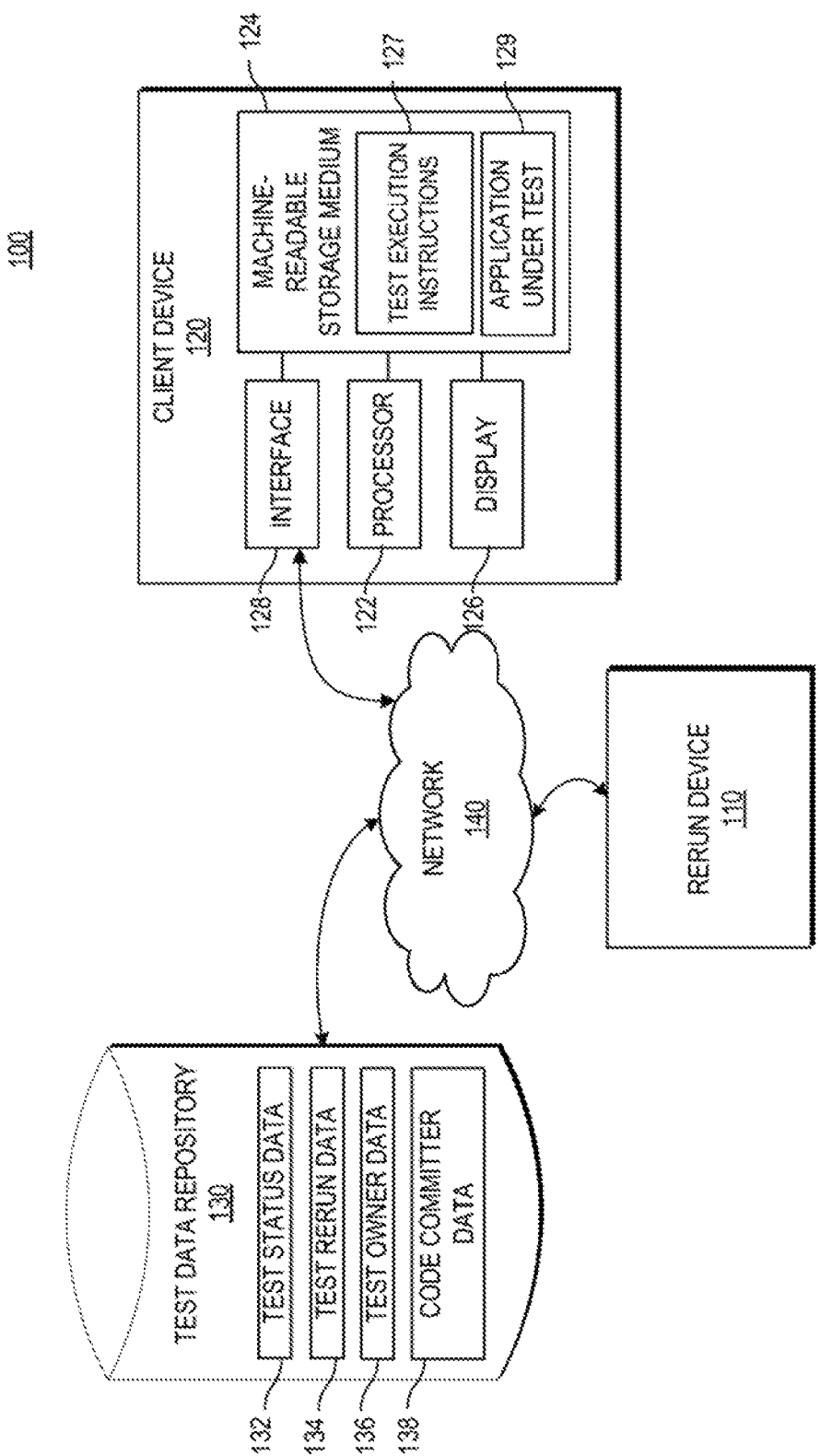
FIG. 1 is a block diagram of an example system for automatically rerunning test executions consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, some application development practices may ensure compatibility of code by verifying test executions of an application under test ('AUT'). The problems with these types of tests, however, is that they tend to be unstable. For example, these tests may be executed multiple times with different results, without any additional code changes between the different executions. This may be due, in part, to high concurrency that may affect the rate at which different parts of the AUT are loaded (e.g., some portions of a UI of an AUT may be slow to load). If a test is written incorrectly, it may indicate that the application failed simply because it did not load the portion of the application in time. Traditionally, these unstable tests were either ignored or rerun a static (e.g., a fixed) number of times for each test execution failure. However, simply ignoring the unstable tests may lead to poor quality code being integrated into the application. Furthermore, rerunning the test a static number of times for each test execution failure may unnecessarily utilize a significant amount of computing resources, resulting in slower computing system performance as well as slowing down the application development lifecycle.

Instead of rerunning failed test executions a static number of times, examples disclosed herein relate to automatically causing the rerun of test executions based on a dynamic (e.g., an on the fly) determination of the number of times to rerun a failed test. In other words, in some examples, the number of times to rerun a failed test execution may be determined separately for each failed test execution, and/or may be tailored to a particular test, a particular test owner, and/or a particular test committer. To this end, some examples may capture data during executions of a test and may dynamically determine a number of reruns to execute based on the captured data. Additionally, some examples may automatically cause the performance of rerun executions of the test until one of the rerun executions of the test passes, where the rerun executions of the test are performed up to the number of times.

Referring now to the drawings, FIG. 1 is a block diagram of an example system 100 for automatically rerunning test executions consistent with disclosed implementations. System 100 may be implemented in a number of different configurations without departing from the scope of the disclosed examples. In the example shown in FIG. 1, system 100 may include a rerun device 110, a client device 120, a test data repository 130, and a network 140 for connecting rerun device 110 with client device 120 and/or test data repository 130.

Rerun device 110 may be a computing system that performs various functions consistent with disclosed examples. For example, rerun device 110 may be a server, a desktop computer, a laptop computer, and/or any other suitable type of computing device(s). In some examples, rerun device 110 may process information received from client device 120 and/or test data repository 130. For example, rerun device 110 may dynamically determine, for a failed execution of a test, a number of reruns to execute based on data captured from client device 120 and/or received from test data repository 130. For example, rerun device 110 may dynamically determine the number of reruns by analyzing the captured data to determine whether the failed execution of the test failed due to a real application failure (e.g., the test is executed multiple times with the same failing result and thus the failure is likely due to an issue with the application code) or a failure due to test instability (e.g., the test is executed multiple times with different results, such as passing and failing, without any additional code changes between the different executions; thus, the failure is likely do to an issue with the test code). Examples of rerun device 110 and certain functions that may be performed by device 110 are described in greater detail below with respect to, for example, FIGS. 2-4.

Client device 120 may be a computing system operated by a user. For example, client device 120 may be a desktop computer, a laptop computer, a tablet computing device, a mobile phone, a server, and/or any other type of computing device(s). In some examples, client device 120 may be a computing device to perform operations consistent with certain disclosed implementations. For example, client device 120 may be adapted to transmit data related to test executions of an AUT to rerun device 110, such as, for example, test status data (e.g., data related to whether an execution of the test passed or failed), test rerun data (e.g. data related to whether the execution is an original execution of the test or a rerun execution of the test), test owner data (e.g. data related an individual that wrote or changed the test), code committer data (data related to an individual that committed the application code that is being tested by the execution of the test), and/or any other suitable data. In some examples, the data related to the test executions may include at least two of the test status data, the test rerun data, the test owner data, and the code committer data.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution instructions 127 and/or instructions related to AUT 129) to test an AUT. While in the example shown in FIG. 1 the AUT resides on client device 120, test execution instructions 127 and/or the AUT 129 may reside on different machines and/or may span multiple computing devices or systems. Machine-readable storage medium 124 may be any electronic, magnetic, optical, or other non-transitory storage device that stores instructions executed by processor 122. Display device 126 may be any type of display device that presents information, such as a user interface of an AUT, to a user (e.g., a tester) operating client device 120. Interface device 128 may be any combination of hardware and/or programming that facilitates the exchange of data between the internal components of client device 120 and external components, such as rerun device 110. In some examples, interface device 128 may include a network interface device that allows client device 120 to receive and send data to and from various components, such as to and from rerun device 110 via network 140.

Test data repository 130 may be any type of storage system configuration that facilitates the storage of data. For example, test data repository 130 may facilitate the locating, accessing, and retrieving of data captured during test executions of an AUT (e.g., SaaS, SQL, Access, etc. databases). Test data repository 130 can be populated by a number of methods. For example, rerun device 110 may populate test data repository 130 with data related to test executions performed on client device 120, and store the data in test data repository 130. For example, rerun device 110 may populate test data repository 130 with test status data 132, test rerun data 134, test owner data 136, and code committer data 138. While in the example shown in FIG. 1 test data repository 130 is a single component external to components 110 and 120, test data repository 130 may comprise separate components and/or may be part of devices 110, 120, and/or another device. In some implementations, test data repository 130 may be managed by components of device 110 and/or other devices that are capable of accessing, creating, controlling and/or otherwise managing data remotely through network 140.

Network 140 may be any type of network that facilitates communication between remote components, such as rerun device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one rerun device 110, client device 120, test data repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component(s) (e.g., components 110, 120, 130, 140, and/or component(s) not shown in FIG. 1). For example, portions of rerun device 110 may be part of the framework of a testing application hosted on client device 120 and represented by test execution instructions 127.

Figure 2:
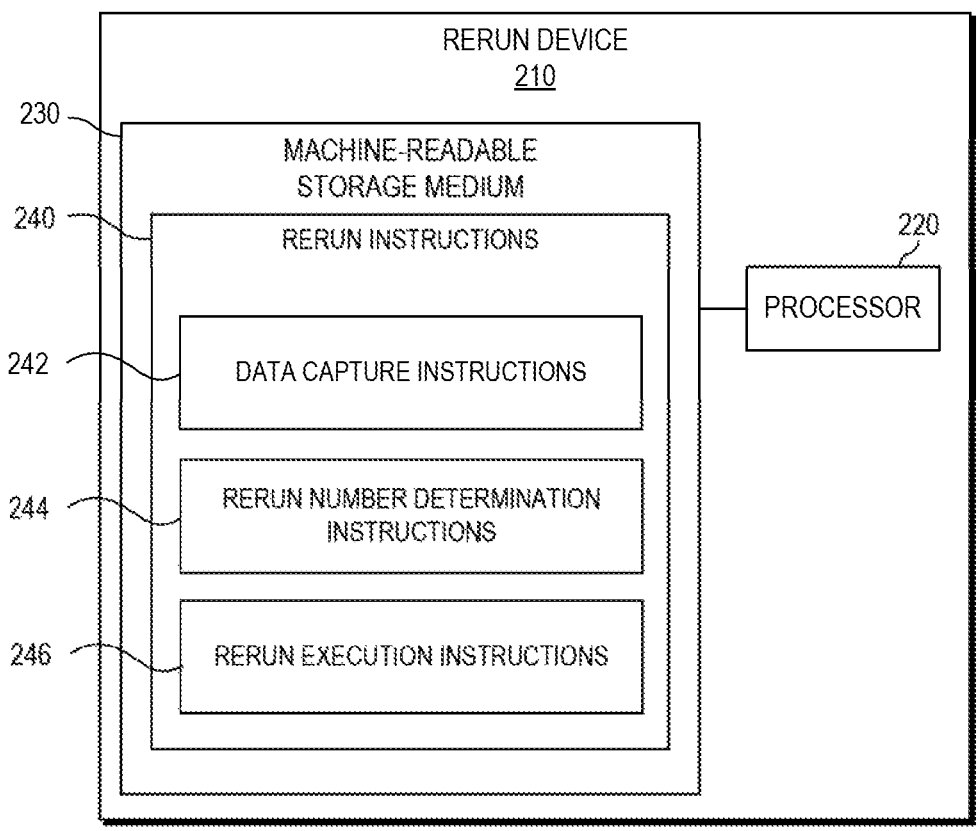
FIG. 2 is a block diagram of an example rerun device consistent with disclosed implementations.

FIG. 2 is a block diagram of an example rerun device 210 consistent with disclosed implementations. In certain aspects, rerun device 210 may correspond to rerun device 110 of FIG. 1. Rerun device 210 may be implemented in various ways. For example, rerun device 210 may be a special purpose computer, a server, a mainframe computer, and/or any other type of computing device or system. In the example shown in FIG. 2, rerun device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute rerun instructions 240 (e.g., instructions 242, 244, and/or 246) stored in machine-readable storage medium 230 to perform operations consistent with disclosed examples.

Machine-readable storage medium 230 may be any electronic, magnetic, optical, or other physical storage device that stores executable instructions. Thus, machine-readable storage medium 230 may be, for example, memory, a storage drive, an optical disc, and the like. In some implementations, machine-readable storage medium 230 may be a non-transitory computer-readable storage medium, where the term "non-transitory" does not encompass transitory propagating signals. Machine-readable storage medium 230 may be encoded with instructions that, when executed by processor 220, perform operations consistent with disclosed implementations. For example, machine-readable storage medium 230 may include instructions that perform operations to capture data during executions of a test, dynamically determine, for a failed execution of the test (e.g., in response to a failed execution of the test, a number of reruns to execute based on the captured data, and automatically cause the performance of rerun executions of the test until one of the rerun executions passes, the rerun executions being performed up to the number of times. In the example shown in FIG. 2, machine-readable storage medium 230 may include data capture instructions 242, rerun number determination instructions 244, and rerun execution instructions 246.

Data capture instructions 242 may function to capture data during executions of a test. For example, when data capture instructions 242 are executed by processor 220, data capture instructions 242 may cause processor 220 and/or another processor to capture data during test executions of the AUT. The data may relate to executions of one test or a plurality of test and/or may relate to the testing of one application or of multiple applications. In some examples, the test data may include test status data (e.g, test failed, test passed, execution time, test duration, etc.), test rerun data (e.g., number of reruns performed, etc.), test owner data (e.g., test owner name(s) who created and/or changed the test, the time the test was created and/or changed, the test owner email address, etc.), and/or code committer data (e.g., a number of tests run during a particular commit, the status of those tests, the code committer email address, code commit number, etc.). For example, data capture instructions 242 may cause processor 220 and/or another processor to access, receive, or otherwise obtain the data from one or more computing systems that execute the test and/or implement the AUT during the test executions. In some examples, the data may be captured by installing agents on various physical or virtual system components to monitor how the particular component(s) function and to transmit the data to a storage device, such as a test data repository 130. The transmitted data may then be received and/or otherwise captured by rerun device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component(s) memory usage. As another example, the data may be captured from source control information.

Rerun number determination instructions 244 may function to dynamically determine, for a failed execution of a test, a number of reruns to execute based on the captured data. For example, when rerun number determination instructions 244 are executed by processor 220, rerun number determination instructions 244 may cause processor 220 to dynamically determine the number of reruns by analyzing the captured data to determine whether the execution of the test failed due to a real application failure (e.g., the test is executed multiple times with the same failing result and thus the failure is likely due to an issue with the application code) or a failure due to test instability (e.g., the test is executed multiple times with different results, such as passing and failing, without any additional code changes between the different executions; thus, the failure is likely do to an issue with the test code rather than an issue with the application). In some examples, the rerun number determination instructions may analyze the captured data by calculating, based on the captured data, various values such as an average number of reruns needed until an execution of the test passed, a maximum number of reruns needed until an execution of the test passed, a code committer value, and/or a test owner value. At least one of these values may be used to calculate the number of reruns to execute. For example, the number of reruns to execute may be calculated based on at least two of the average number of reruns, the maximum number of reruns, the code committer value, and the test owner value. Examples of dynamically determining the number of reruns to execute are described in further detail below with respect to, for example, FIGS. 3 and 4.

Rerun execution instructions 246 may function to cause, in response to the dynamic determination of the number of reruns to execute, automatic rerun executions of the test until one of the rerun executions passes, where the rerun executions are performed up to the number of times. For example, when rerun execution instructions 246 are executed by processor 220, rerun execution instructions 246 may cause processor 220 to transmit instructions to client device 120 to execute the automatic rerun executions of the failed test up to the number of times and/or until a rerun execution passes. As another example, when rerun instructions 246 are executed by processor 220, rerun execution instructions 246 may cause processor 220 to automatically perform rerun executions of the test (e.g., the failed execution of the test) until one of the rerun executions passes, up to a dynamically calculated number of times. Thus, in some examples the device associated with rerun execution instructions 246 (e.g., a rerun engine) may perform the automatic rerun executions of the test. Examples of causing automatic rerun executions of the test are described in further detail below with respect to, for example, FIGS. 3 and 4.

In some examples, rerun execution instructions 246 may also function to cause the generation of an alert identifying an unstable test. For example, when rerun execution instructions 246 are executed by processor 220, rerun execution instructions 246 may cause processor 220 to generate an alert based on a prioritization of tests. The prioritization of tests may separate unstable tests from real application failures, and may be based on a particular test's average duration and/or a count of a number of failed executions of the test. For example, generating the alert may include causing the generation of a user interface to be displayed on display 126 of client device 120, and the user interface may include an ordered list of the tests based on the prioritization.

Figure 3:
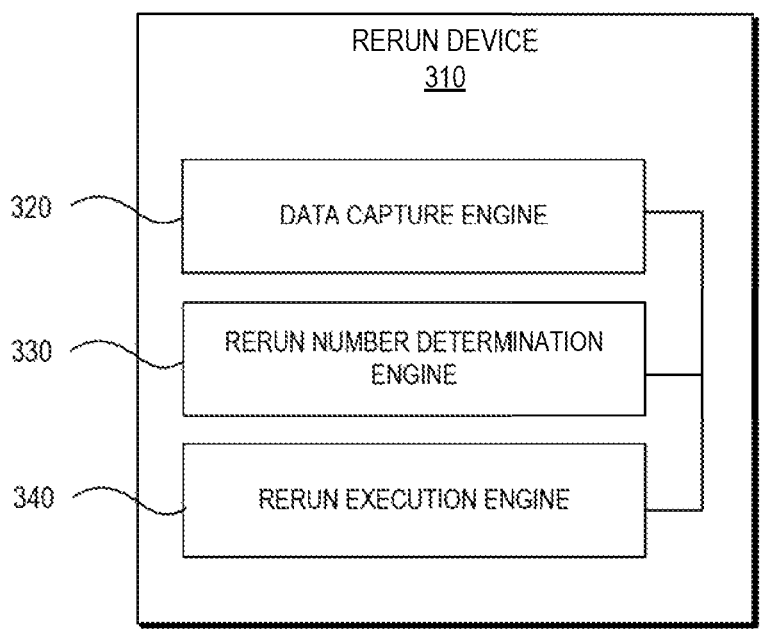
FIG. 3 is a block diagram of an example rerun device consistent with disclosed implementations.

FIG. 3 is a block diagram of an example rerun device 310 consistent with disclosed implementations. In certain aspects, rerun device 310 may correspond to rerun device 110 of FIG. 1 and/or rerun device 210 of FIG. 2. Device 310 may be implemented in various ways. For example, device 310 may be a special purpose computer, a server, a mainframe computer, and/or any other suitable type of computing device or system. In the example shown in FIG. 3, device 310 may include a data capture engine 320, a rerun number determination engine 330, and a rerun execution engine 340.

Engines 320, 330, and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by rerun device 210 of FIG. 2, such as operations performed when rerun instructions 240 are executed by processor 220 (described, for example, with respect to FIG. 2). In FIG. 3, data capture engine 320 may represent a combination of hardware and programming that performs operations similar to those performed when processor 220 executes data capture instructions 242. Similarly, rerun number determination engine 330 may represent a combination of hardware and programming that performs operations similar to those performed when processor 220 executes rerun number determination instructions 244, and rerun execution engine 340 may represent a combination of hardware and programming that performs operations similar to those performed when processor 220 executes rerun execution instructions 246.

Figure 4:
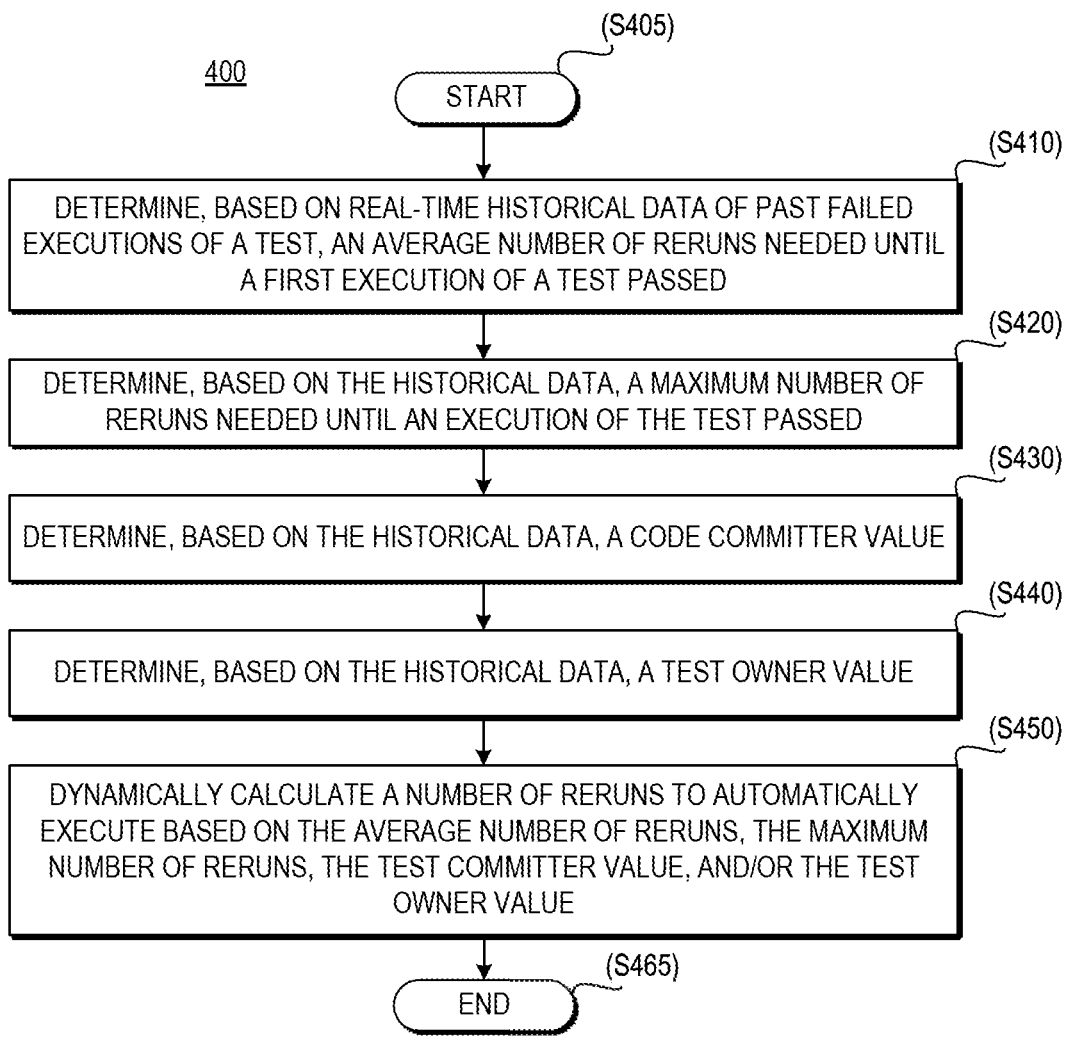
FIG. 4 is a flow chart of an example process for dynamically calculating a number of reruns to execute consistent with disclosed implementations.

FIG. 4 is a flow chart of an example process 400 for dynamically calculating a number of reruns to execute consistent with disclosed implementations. Although execution of process 400 is described below with reference to system 100 of FIG. 1 and/or specific components of system 100, other suitable systems and devices for execution of at least one step of process 400 may be used. For example, processes described below as being performed by rerun device 110 may be performed by rerun device 210, rerun device 310, and/or any other suitable device. Process 400 may be implemented in the form of executable instructions stored on a machine-readable storage medium and/or in the form of electronic circuitry.

Process 400 may start (step S405) after data has been captured during test executions of an AUT. For example, rerun device 110 may include instructions stored in a non-transitory computer-readable storage medium that, when executed by a processor, capture and store data as described above. Thus, the data may represent historical data related to test executions (e.g., test status data, test rerun data, test owner data, code committer data, and/or the like for a plurality of tests and a plurality of executions of the tests) and the data may be updated in-real time to account for each test execution. Thus, in some examples, the captured data may include real-time historical data of past failed executions of a test.

Additionally, in some implementations, rerun device 110 may include instructions stored in a non-transitory computer-readable storage medium that, when executed by a processor, may access the captured data from a storage device, filter the accessed data, and/or use the filtered data to perform the determinations associated with at least one of steps S410, S420, S430, S440, S450 (described in further detail below). For example, rerun device 110 may query test data repository 130 in a manner that limits the data provided in response to the query to a particular period of time, to a particular test, to a particular test owner, to a particular code committer, and the like, and may use that data to perform one or more of steps S410 through S450. As another example, rerun device 110 may query test data repository 130 for the entire data set and may perform the calculation process based on the entire data set stored in test data repository 130.

Process 400 may include determining, based on real-time historical data of past failed executions of a test, an average number of reruns needed until an execution of the test (e.g. a first execution of the test, a past failed execution of the test, etc.) passed. For example, rerun device 110 may include instructions that, when executed by a processor, may function to calculate the average number of reruns needed. For example, rerun device 110 may parse the data to: (1) determine which executions of the test failed; (2) calculate a total number of failed test executions; (3) determine, for each failed execution of the test, how many reruns associated with the failed execution were needed until the test passed (e.g., the rerun of the test resulted in a pass); (4) calculate the total number of reruns that were needed; (5) calculate the average number of reruns needed until an execution of the test passed by dividing the total number of reruns that were needed by the total number of failed test executions; and (6) store the average number of reruns needed in a storage device.

Process 400 may also include determining, based on the historical data, a maximum number of reruns needed until an execution (e.g., a second execution of the test passed). For example, in some implementations rerun device 110 may include instructions stored in a non-transitory computer-readable storage medium that, when executed by a processor, may function to calculate the maximum number of reruns needed. For example, rerun device 110 may parse the data to (1) determine which executions of the test failed; (2) determine, for each failed execution of the test, how many reruns associated with the failed execution were needed until the test passed (e.g., the rerun of the test resulted in a pass); (3) assign the highest number of reruns associated with the failed execution as the maximum number of reruns needed; and (4) store the maximum number of reruns needed in a storage device.

Process 400 may also include determining, based on the historical data, a code committer value (step S430). For example, rerun device 100 may calculate the code committer value by analyzing the historical data (e.g., data captured during executions of a plurality of tests) to determine whether a code committer associated with the failed execution of the test (e.g., a first test) has a record of poor committer performance. For example, in some implementations rerun device 110 may include instructions stored in a non-transitory computer-readable storage medium that, when executed by a processor, may function to calculate the code committer value by determining a committer performance ratio between a total number of test broken by the code committer and a total number of test associated with the code committer. The total number of tests broken by the code committer may correspond with the total number of tests that failed due to a real application failure (e.g., due to application code committed by the code committer). Furthermore, the total number of test associated with the code committer may correspond with the total number of tests that, when executed, test application code committed by the code committer. For example, the total number of tests associated with the code committer may correspond with the number of test executed during a particular commit. Thus, in some examples, the record of poor committer performance may be based on a number of times test associated with the code committer have failed. Furthermore, in some examples, higher committer performance ratios (e.g., a significant percentage of broken tests) may indicate poor committer performance.

As another example, the code committer value may relate to or otherwise be based on a comparison between the performance of a particular code committer to that of other code committers. For example, based on the record of poor performance, rerun device 110 may assign a rank (e.g., a first rank) or other numerical value as the code committer value, and may store the code committer value in a storage device. In some implementations, lower rankings (e.g., bottom third) or numerical values may correspond with comparatively higher committer performance ratios.

Process 400 may also include determining, based on the historical data, a test owner value (step S440). For example, rerun device 100 may calculate the test owner value by analyzing the historical data (e.g., data captured during executions of a plurality of tests) to determine whether a test owner of the failed execution of the test has a record of poor owner performance. For example, in some implementations rerun device 110 may include instructions stored in a non-transitory computer-readable storage medium that, when executed by a processor, may function to calculate the test owner value by determining a test owner performance ratio between a total number of failed tests written or changed by the test owner and a total number of tests written or changed by the test owner. In some examples, higher test owner performance ratios (e.g. a significant percentage of failed tests written or changed by the test owner) may indicate poor test owner performance.

As another example, like with the code committer value, the test owner value may related to or otherwise be based on a comparison between the performance of a particular test owner to that of other test owners. For example, based on the record of poor performance, rerun device 110 may assign a rank (e.g., a second rank) or other numerical value as the test owner value, and may store the test owner value in a storage device. In some implementations, lower rankings (e.g., bottom third) or numerical values may correspond with comparatively higher owner performance ratios.

Process 400 may also include dynamically calculating a number of reruns to automatically execute based on the average number of reruns, the maximum number of reruns, the code committer value, and/or the test owner value (step S450). For example, in some implementations rerun device 110 may include instructions stored in a non-transitory computer-readable storage medium that, when executed by a processor, may function to dynamically calculate the number of reruns by determining whether the test owner value and/or the code committer value is within a particular range. For example, rerun device 110 may assign a predetermined value as the number of reruns if the test owner value is within a first range. In some examples, the first range may be associated with test owner values corresponding to poor owner performance. If not, and if the code committer value is within a second range, rerun device 110 may calculate the average number of reruns (e.g., using the methods described above) and may assign the average number of reruns needed as the number. In some examples, the second range may be associated with code committer values corresponding to poor committer performance. If the test owner value is not within the first range (e.g., greater than the first range) or if the code committer value is not within the second range (e.g., greater than the second range), rerun device may calculate the maximum number of reruns needed (e.g., using the methods described above) and may assign the maximum number of reruns needed as the number. Thus, in some examples, calculating the number of reruns to execute includes assigning, as the number, one of a predetermined value, the average number of reruns needed, or the maximum number of reruns needed.

The disclosed examples may include systems, devices, machine-readable storage media, and methods for automatically rerunning test executions. For purposes of explanation, certain examples are described with reference to the components illustrated in FIGS. 1-4. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-4. Thus, the present disclosure merely sets forth possible examples of implementations, and many variations and modifications may be made to the described examples. All such modifications and variations are intended to be included within the scope of this disclosure and protected by the following claims.

We claim:

1. A system for automatically rerunning test executions comprising:
   a processor; and
   a memory storing instructions that when executed cause the processor to:
   capture data during executions of an application-under-test (AUT);
   determine, based on historical data of a failed test of the AUT, an average number of reruns of the failed test needed until the failed test passed;
   determine, based on the historical data of the failed test, a highest number of reruns of the failed test needed until the failed test passed;
   determine a rank value of a particular code committer who committed the AUT for testing;
   determine whether the rank value of the particular code committer is within a first predetermined range;
   in response to a determination that the rank value of the particular code committer is within the first predetermined range, cause the failed test to automatically rerun until the failed test passes, wherein the failed test is rerun up to the determined average number of reruns;
   in response to a determination that the ranking value of the particular code committer is not within the first predetermined range, cause the failed test to automatically rerun until the failed test passes, wherein the failed test is rerun up to the determined highest number of reruns; and
   in response to a determination that the failed test does not pass after the determined average number of reruns or after the determined highest number of reruns, generate an alert of the failed test to the particular code committer.

2. The system of claim 1, wherein the alert causes the particular code committer to determine whether the failed test was due to a real application failure or due to a test instability.

3. The system of claim 1, wherein the determination of the rank value of the particular code committer is based on a comparison between a performance of the particular code committer and performances of other code committers.

4. The system of claim 1, wherein the determination of the rank value of the particular code committer is based on a performance ratio between a total number of tests failed by the particular code committer and a total number of tests associated with the particular code committer.

5. The system of claim 1, wherein, prior to the determination of whether the rank value of the particular code committer is within the first predetermined range, the instructions are executable to cause the processor to:
   determine, based on the historical data, a test owner value of a particular test owner who wrote the failed test; and
   determine a total number of reruns of the failed test to execute based on the test owner value of the particular test owner.

6. The system of claim 5, wherein the instructions are executable to cause the processor to:
   determine whether the test owner value is within a second predetermined range corresponding to a poor owner performance;
   in response to a determination that the test owner value is within the second predetermined range, assign a predetermined value as the total number of reruns; and
   in response to a determination that the test owner value is not within the second predetermined range, determine whether the rank value of the particular code committer is within the first predetermined range.

7. The system of claim 5, wherein, to determine the test owner value of the particular test owner, the instructions are executable to cause the processor to:
   determine a test owner performance ratio between a total number of failed tests written or changed by the particular test owner and a total number of tests written or changed by the particular test owner; and
   calculate the test owner value of the particular test owner based on the test owner performance ratio.

8. The system of claim 1, wherein:
   the captured data further includes data related to whether an execution of the AUT passed or failed, data related to whether the execution of the AUT is an original execution of the AUT or a rerun execution of the AUT, data related to an individual that wrote or changed the failed test, and data related to the particular code committer.

9. A computer-implemented method comprising:

capturing, by a processor of a computing device, data during executions of an application-under-test (AUT);

determining, based on historical data of a failed test of the AUT, an average number of reruns of the failed test needed until the failed test passed;

determining, based on the historical data of the failed test, a highest number of reruns of the failed test needed until the failed test passed;

determining, by the processor, a rank value of a particular code committer who committed the AUT for testing;

determining, by the processor, whether the rank value of the particular code committer is within a first predetermined range;

in response to a determination that the rank value of the particular code committer is within the first predetermined range, causing, by the processor, the failed test to automatically rerun until the failed test passes, wherein the failed test is rerun up to the determined average number of reruns;

in response to a determination that the ranking value of the particular code committer is not within the first predetermined range, causing, by the processor, the failed test to automatically rerun until the failed test passes, wherein the failed test is rerun up to the determined highest number of reruns; and in response to a determination that the failed test does not pass after the determined average number of reruns or after the determined highest number of reruns, generating, by the processor, an alert of the failed test to the particular code committer.

10. The computer-implemented method of claim 9, wherein the method comprises, prior to determining whether the rank value of the particular code committer is within the first predetermined range:

determining a test owner value of a particular test owner who wrote or changed the failed test, and determining a total number of reruns of the failed test to execute based on the test owner value of the particular test owner.

11. The computer-implemented method of claim 10, wherein the test owner value of the particular test owner is determined based on a comparison between a performance of the particular test owner and performances of other test owners.

12. A non-transitory computer-readable storage medium storing instructions which, when executed by a processor, cause the processor to:

capture data during executions of an application-under-test (AUT);

determine, based on historical data of a failed test of the AUT, an average number of reruns of the failed test needed until the failed test passed;

determine, based on the historical data of the failed test, a highest number of reruns of the failed test needed until the failed test passed;

determine a rank value of a particular code committer who committed the AUT for testing;

determine whether the rank value of the particular code committer is within a first predetermined range;

in response to a determination that the rank value of the particular code committer is within the first predetermined range, cause the failed test to automatically rerun until the failed test passes, wherein the failed test is rerun up to the determined average number of reruns;

in response to a determination that the ranking value of the particular code committer is not within the first predetermined range, cause the failed test to automatically rerun until the failed test passes, wherein the failed test is rerun up to the determined highest number of reruns; and in response to a determination that the failed test does not pass after the determined average number of reruns or after the determined highest number of reruns, generate an alert of the failed test to the particular code committer.

13. The non-transitory computer-readable storage medium of claim 12, wherein, prior to the determination of whether the rank value of the particular code committer is within the first predetermined range, the instructions are executable to cause the processor to:

determine a test owner value of a particular test owner who wrote the failed test, and determine a total number of reruns of the failed test to execute based on the test owner value of the particular test owner.

14. The non-transitory computer-readable storage medium of claim 13, wherein, to determine the test owner value, the instructions are executable to cause the processor to:

determine, based on the historical data, a total number of failed tests written or changed by the particular test owner and a total number of tests written or changed by the particular test owner; and calculate the test owner value based on a ratio between the total number of failed tests written or changed by the particular test owner and the total number of tests written or changed by the particular test owner.

15. The non-transitory computer-readable storage medium of claim 12, wherein, to determine the rank value of the particular code committer, the instructions are executable to cause the processor to:

determine, based on the historical data, a committer performance ratio between a total number of tests failed by the particular code committer and a total number of tests associated with the particular code committer; and calculate the rank value of the particular code committer based on the committer performance ratio.

16. The non-transitory computer-readable storage medium of claim 13, wherein the instructions are executable to cause the processor to:

determine whether the test owner value is within a second predetermined range corresponding to a poor owner performance;

in response to a determination that the test owner value is within the second predetermined range, assign a predetermined value as the total number of reruns; and in response to a determination that the test owner value is not within the second predetermined range, determine whether the rank value of the particular code committer is within the first predetermined range.

17. The computer-implemented method of claim 9, wherein determining the rank value of the particular code committer value comprises:

determining, based on the historical data, a committer performance ratio between a total number of tests failed by the particular code committer and a total number of tests associated with the particular code committer; and calculating the rank value of the particular code committer based on the committer performance ratio.

18. The computer-implemented method of claim 10, wherein determining the total number of reruns of the failed test to execute comprises:
- determining whether the test owner value is within a second predetermined range corresponding to a poor owner performance;
- in response to a determination that the test owner value is within the second predetermined range, assigning a predetermined value as the total number of reruns; and
- in response to a determination that the test owner value is not within the second predetermined range, determining whether the rank value of the particular code committer is within the first predetermined range.

19. The computer-implemented method of claim 9, wherein the rank value of the particular code committer is determined based on a comparison between a performance of the particular code committer and performances of other code committers.

20. The non-transitory computer-readable storage medium of claim 12, wherein the rank value of the particular code committer is determined based on a comparison between a performance of the particular code committer and performances of other code committers.

\* \* \* \* \*